(12) United States Patent
Reitmeyer et al.

(10) Patent No.: US 7,974,952 B1
(45) Date of Patent: Jul. 5, 2011

(54) TRACKING FILE SYSTEM CHANGES FOR BACKUP

(75) Inventors: Richard Reitmeyer, Menlo Park, CA (US); Robert Lyon, Palo Alto, CA (US); Michael Pyle, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 116 days.

(21) Appl. No.: 11/324,017

(22) Filed: Dec. 29, 2005

Related U.S. Application Data

(60) Provisional application No. 60/672,692, filed on Apr. 18, 2005.

(51) Int. Cl.
*G06F 7/00* (2006.01)

(52) U.S. Cl. .......................................... 707/641

(58) Field of Classification Search .................. 704/204, 704/641
See application file for complete search history.

(56) References Cited

U.S. PATENT DOCUMENTS 6,799,190 B1 * 9/2004 Boothby ....................... 707/204

* cited by examiner

*Primary Examiner* — Apu M Mofiz
*Assistant Examiner* — Ajith Jacob
(74) *Attorney, Agent, or Firm* — Van Pelt, Yi & James LLP

(57) ABSTRACT

In some embodiments, a method for tracking changes comprises reviewing a file system, wherein an entry is associated with the file system; providing a first record file, wherein a record is associated with the first record file; comparing the file system entry with the record; providing a second record file; and merging the first record file with the second record file.

30 Claims, 11 Drawing Sheets

| Root Directory | | | |
|---|---|---|---|
| | Directory1 | | |
| | | File1 | |
| | | File2 | |
| | Directory2 | | |
| | | Directory3 | |
| | | | File3 |
| | | File4 | |
| | | File5 | |
| | Directory4 | | |
| | | File6 | |
| | File7 | | |

FIG. 4A

| name | Discovery Time | Inode Number | Sibling Offset |
|---|---|---|---|
| / | 1 | 100 | 18 |
| Directory1 | 1 | 101 | 4 |
| File1 | 1 | 102 | 1 |
| File2 | 1 | 103 | 1 |
| ..(end of directory) | 1 | 0 | 0 |
| Directory2 | 2 | 175 | 8 |
| Directory3 | 2 | 176 | 3 |
| File3 | 2 | 177 | 1 |
| .. (end of directory) | 2 | 0 | 0 |
| File4 | 2 | 178 | 1 |
| File5 | 2 | 179 | 1 |
| .. (end of directory) | 2 | 0 | 0 |
| Directory4 | 2 | 180 | 3 |
| File6 | 2 | 181 | 1 |
| .. (end of directory) | 2 | 0 | 0 |
| File7 | 2 | 182 | 1 |
| .. (end of directory) | 1 | 0 | 0 |

FIG. 4B

TRACKING FILE SYSTEM CHANGES FOR BACKUP

CROSS REFERENCE TO OTHER APPLICATIONS

This application claims priority to U.S. Provisional Patent Application No. 60/672,692 entitled BACKUP INFORMATION MANAGEMENT filed Apr. 18, 2005 which is incorporated herein by reference for all purposes.

BACKGROUND OF THE INVENTION

Backups of computer systems are typically performed regularly. Two methods of backing up data include a full backup where all the files are saved, and a non-full backup where fewer than all the files are saved. One example of a non-full backup is an incremental backup where the files that have been changed since a prior backup are saved. A potential problem is correctly determining which files to back up. Accordingly, a more reliable way of saving information is needed.

BRIEF DESCRIPTION OF THE DRAWINGS

Various embodiments of the invention are disclosed in the following detailed description and the accompanying drawings.

FIGS. 4A-4B show an example of a directory tree and its records for some embodiments.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
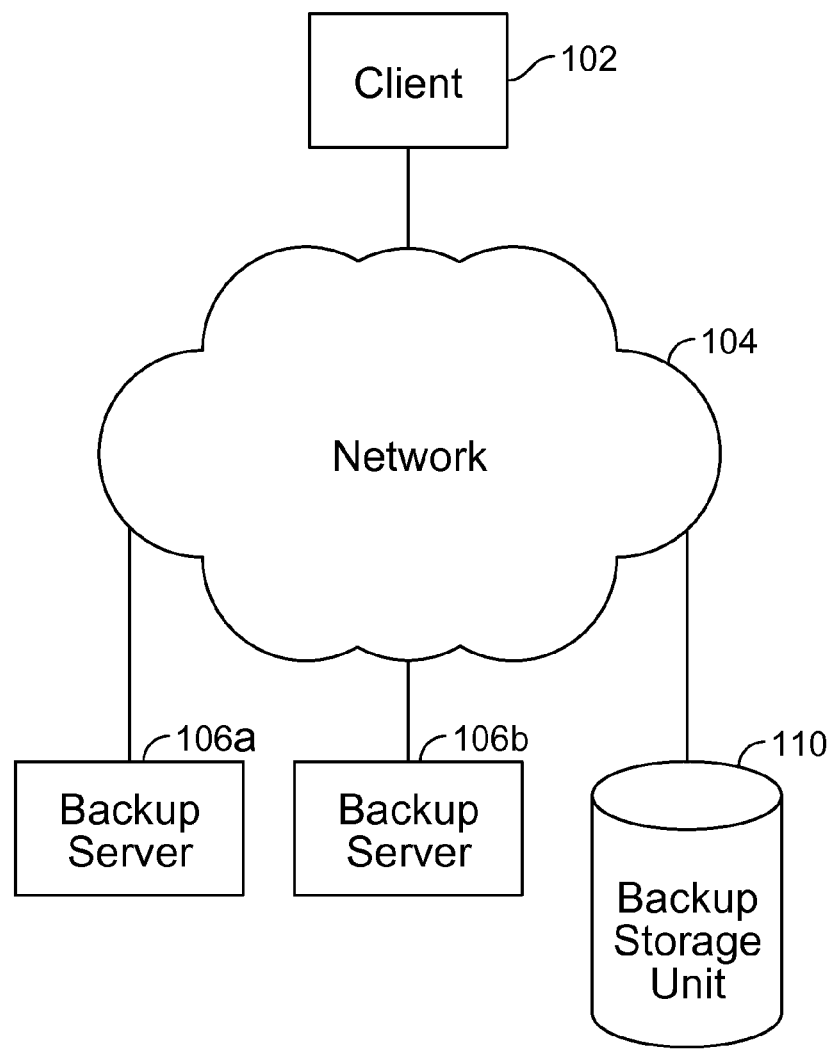
FIG. 1 illustrates an embodiment of a system for information management.

FIG. 1 illustrates an embodiment of a system for information management. The example of FIG. 1 shows a backup system. In this example, client 102, the client to be backed up, is shown to be coupled with backup server 106a, backup server 106b, and backup storage unit 110 through network 104. In other embodiments, any number of clients 102, backup servers 106a-b, and backup storage units 110 can exist. Each backup server 110 can also have multiple processes running to backup clients 102. Network 104 can be any public or private network and/or combination thereof. Examples of such networks includes the Internet, intranet, LAN, WAN, and other forms of connecting multiple systems and/or groups of systems together. The example shown in FIG. 1 has been simplified for illustrative purposes. For example, backup server 106a and backup server 106b can sequentially or simultaneously back up different parts of client 102 file system or backup all of client 102 file system at different times to the backup storage unit 110. In another example, one backup server may be in charge of backing up one client.

Figure 2:
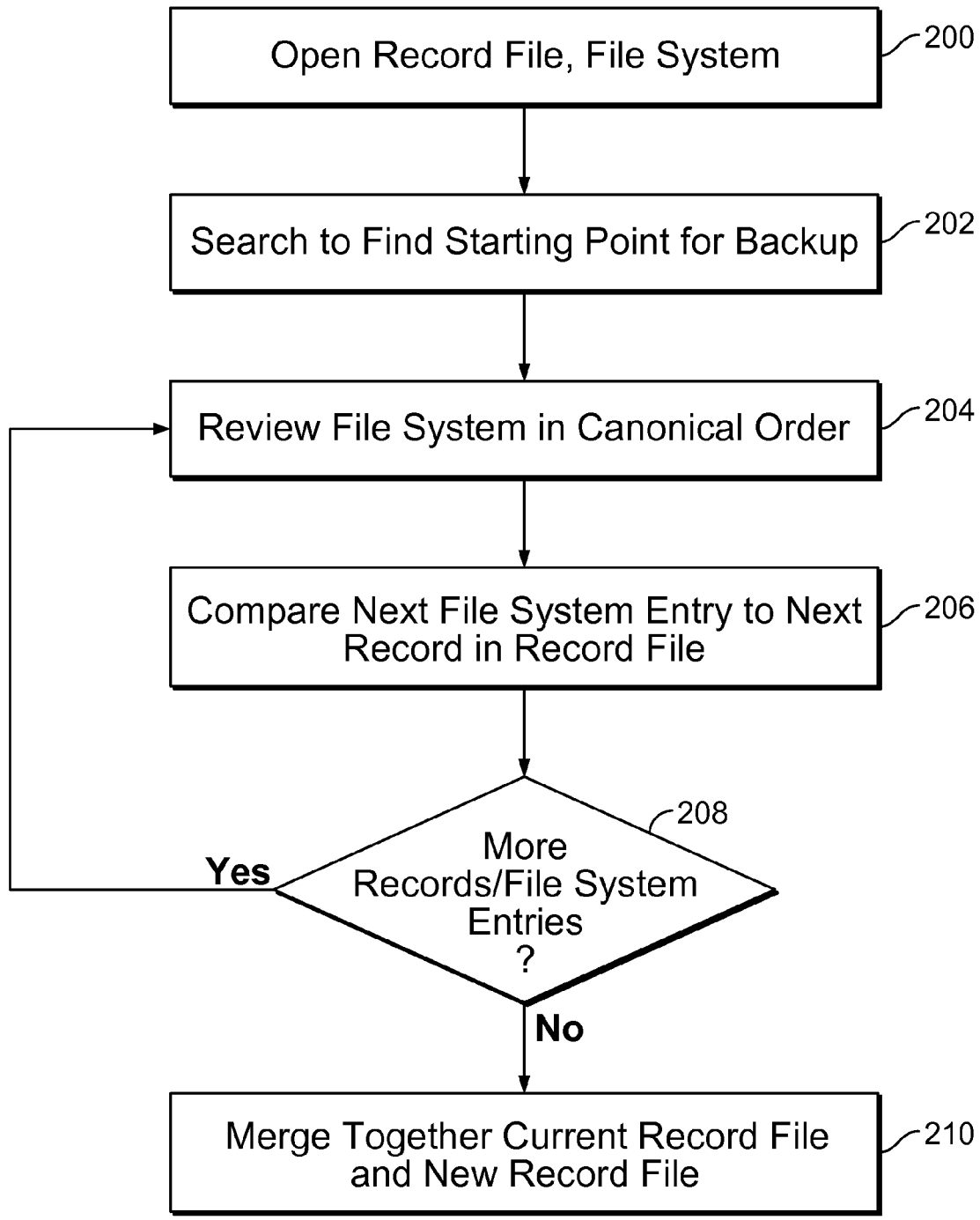
FIG. 2 is a flow diagram for information management in some embodiments.

FIG. 2 is a flow diagram for information management in some embodiments. FIG. 2 may be better understood if viewed in conjunction with FIGS. 4A-4B.

In the example shown in FIG. 2, a record file and the file system are opened at 200. Examples of a record file may include a list of records, a file capable of including records, or a database.

An example of a directory tree in a file system is shown in FIG. 4A, and an example of a record file corresponding to the file system of FIG. 4A is shown in FIG. 4B. In some embodiments, the records in the record file are ordered in the same canonical order as the file system entries of the file system shown in FIG. 4A. A file system entry, as used herein, includes any item that may exist in the file system, such as a directory or file. Canonical ordering, as referred to herein, indicates an order in which the relative order is preserved. For example, if a file is added or removed from the file system shown in FIG. 4A, the canonical order of the corresponding records for the remaining directories and files remain stable such that the relative order of these corresponding records are preserved. For example, if "directory 2" of FIG. 4A is deleted, then "directory 1" will still be before "directory 4" in the record file of FIG. 4B, such that the relative order of the two directories are preserved. The ordering information of the file system may be collected as a backup program scans a file system entry.

The records in the record file may include any information that may be useful. An example of such information includes the name of the file or the directory. The records shown in FIG. 4B are shown to be identified by name, the discovery time, the inode number, and the sibling offset. Examples shown of the name include "directory 1", "file 1", etc. The discovery time may be when a file or directory was first seen, for example, by a backup server, or when a file was added to the system, or when the backup that first discovered the file system entry was started.

The inode number field is shown to include the inode number of the file or directory. Inode number can be used to uniquely identify a file or directory since the inode number generally stays the same regardless of file renaming. The inode number can be used to help distinguish between an old entry in the discovery record and a newly renamed file or directory even if it has the same name as the old entry. Alternatively, the ctime may be used instead of the inode number.

The sibling offset indicates the relative offset to the next sibling (directory or file on the same hierarchal level in the same parent directory) entry in the record file. In some embodiments, offsets are kept from the beginning of the record, such that adjacent files in a directory (immediate siblings) are recorded at offset +1. For example, the first entry "Directory1" is shown to have a sibling offset of 4. This indicates the next sibling "Directory2" exists three entries relatively away from the "Directory 1" entry. Sibling offset of "0" indicates that no sibling exists. Sibling offsets can be realized as relative byte offsets within the record file, or as a count of fixed sized records, or other embodiments, so long as they quickly identify the next sibling's record.

The canonical ordering for this example is based on the entry name in the file system but can be based on any other identifying factor, such as inode number, that can be used to provide a unique, stable path through the file system. In other embodiments, other fields in the discovery record can exist to aid in either identification or traversal of discovery record entries. In the example shown, the filename is stored in the record. In other embodiments the filename could be stored as a full path name.

Special records can be added to denote end-of-directory, as in this embodiment, to facilitate searching. Other examples of information that may be stored in the record file include the parent directory information, or the full filename.

The records may work with any one or more of these fields or any combination thereof. For example, the records may contain just the name of the directories/files. An example of when a record containing just the name of the file system entries may be used is if clients are to be backed up by a single server.

Returning to FIG. 2, once the record file and the file system are opened at 200, a search is performed to find a starting point for backup at 202. For example, in the directory tree shown in FIG. 4A, "directory 2" may have changed since the last backup while "directory 1" has not. In an incremental backup, "directory 2" may be the starting point for the current backup. Further details of the search are later discussed in conjunction with FIG. 5.

The file system is reviewed in canonical order at 204. For example, when the file system entries are read from disk, they may be read in random order. These entries may be sorted to be in a particular, canonical order. For example, the file system entries may be sorted by file name in alphabetical order. The particular canonical order corresponds to the canonical order of the records file.

The next file system entry is then compared to the next record in the record file at 206. In the example shown in FIG. 4A, if "directory 2" is the next file system entry, then "directory 2" is compared to the next entry in the record file of FIG. 4B. The comparison at 206 uses a new record file as well as the current record file. Further details of this comparison are later discussed in conjunction with FIG. 3.

It is then determined whether there are more records in the record file or more file system entries at 208. If there are more records or more file system entries, then the file system is reviewed in canonical order at 204. If, however, there are no more records and no more file system entries at 208, then the current record file and the new record file are merged together at 210. Further details of the merge are later discussed in conjunction with FIGS. 7 and 8.

Figure 3:
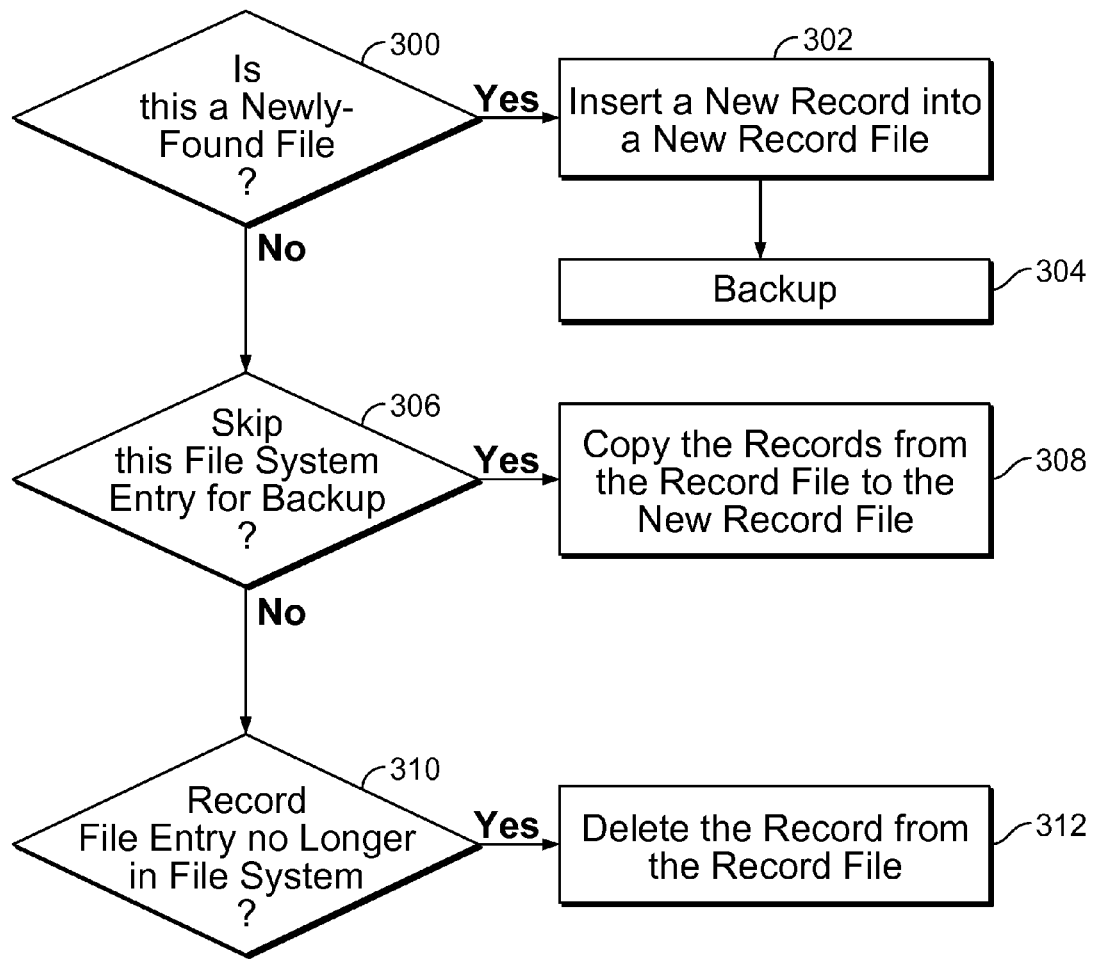
FIG. 3 is an example of comparing a file system entry with a record in the record file in some embodiments.

FIG. 3 is an example of comparing a file system entry with a record in the record file in some embodiments. In this example, it is determined whether this file system entry is a newly found file system entry at 300. If this is a newly found file system entry in the file system, then a new record is inserted into a new record file at 302. In some embodiments this new record file is a different record file then the current record file. The new record file can be similar to the one shown in FIG. 4B except that the records of the current record file of FIG. 4B include records of directories and files that have been seen before, while the new record file includes newly found files that have not been detected before. Like the current record file shown in FIG. 4B, the new record file may include the name of a file system entry, the discovery time, the inode number, and the sibling offset. These record fields are merely examples and any record field that may be useful may be included.

Once a new record is inserted into the new record file 302, the newly found file/directory may be backed up at 304 in this example. If this is not a newly found file system entry in the file system at 300, then it is determined whether this particular file system entry should be skipped for backup at 306. If this file system entry should be skipped for backup, then the record or records associated with this file system entry and its children are copied from the record file to the new record file at 308.

If this file system entry should not be skipped for backup at 306, then it is also determined whether a record in the record file is associated with a file system entry that is no longer in the file system, at 310. An example of when a file system entry might no longer be in the file system is if the file system entry (such as a directory or file) has been deleted from the file system. If this file system entry is no longer in the file system, then the record is deleted from the record file at 312.

Figure 5:
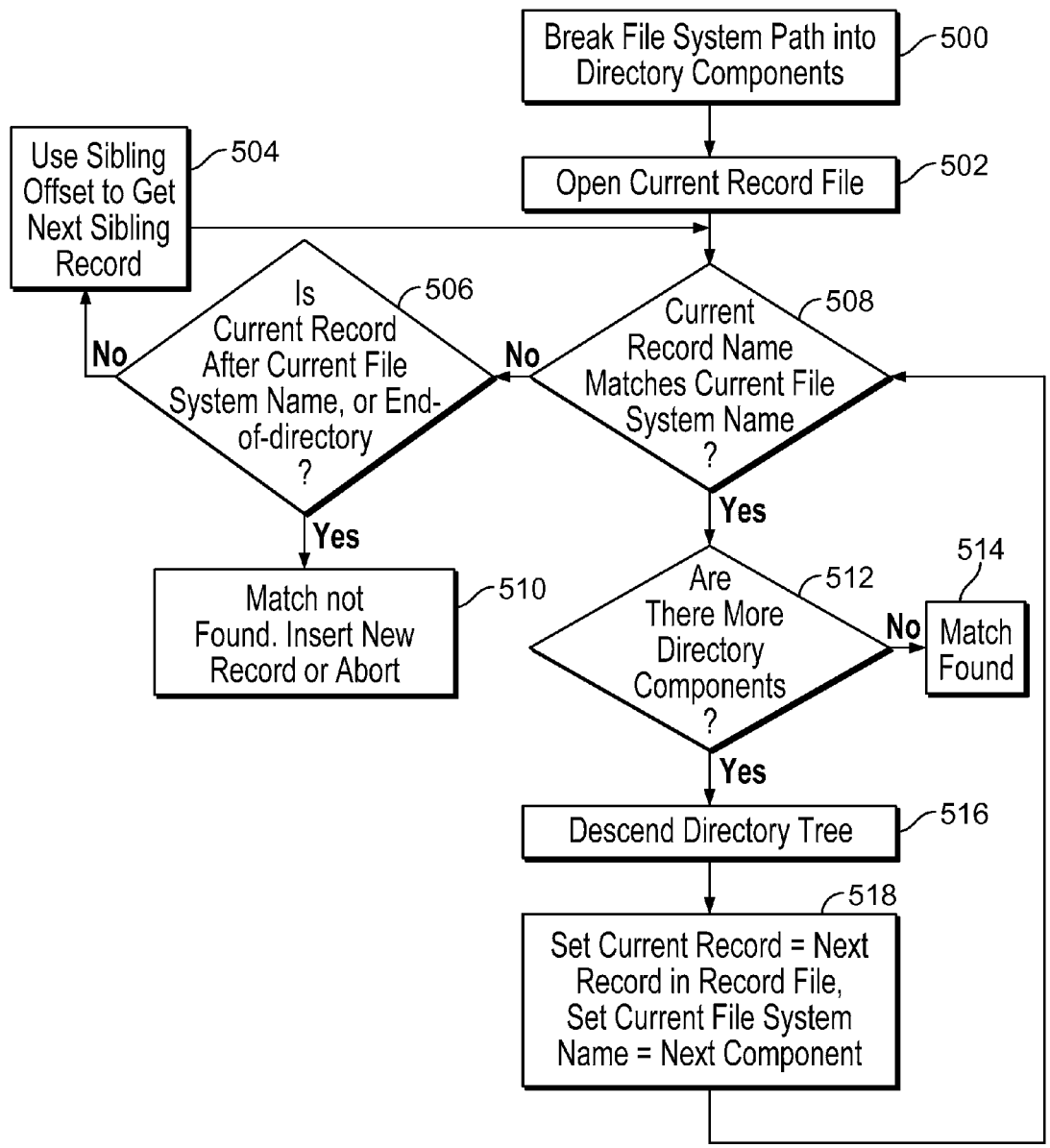
FIG. 5 is a flow diagram of searching in some embodiments.

FIG. 5 is a flow diagram of searching in some embodiments. In this example, a search may be performed to determine whether to backup, such as to perform an incremental backup, a particular file system entry such as a file or directory. In one embodiment, an incremental backup performs a backup of files or directories that have been changed since the last backup.

In the example shown in FIG. 5, a file system path is broken into directory components at 500. For example, the directory tree shown in FIG. 4A can be broken up into directory 1/file 1/file 2.

The current record file is opened at 502. It is then determined whether the current record name matches a current file system name at 508. For example, if "directory 2" is being analyzed, it may be determined whether the name "directory 2" of the directory tree in the file system shown in FIG. 4A matches the name of the record currently being analyzed in the record file of FIG. 4B.

If a current record name does not match a current file system name at 508, then it is determined whether the current record in the record file occurs after the current file system name or end-of-directory at 506. For example, if the canonical order is alphabetical by file name, and the current file system name is P, it can be determined whether the canonical ordering of the current record comes after P. In another example, if the end-of-directory has been reached, and there are more file system entries that belong within that directory, then it may be assumed that those file system entries are new and corresponding records should be added to the record file in some embodiments.

If the current file system name does not match the current record name, then it is assumed that a record corresponding to the current file system name would either be before the current record or after the current record. If it is before the current record then it is assumed that this current file system entry is new, in some embodiments. If the corresponding record to the current file system name should come after the current record, then the current record corresponds to a file system entry that has been deleted in some embodiments. Accordingly, if the current record is placed in an order after a record that would correspond to the current file system name at an end of directory at 506, then it is determined that a match has not been found and a new record corresponding to the current file system name is inserted in a location before the current record at 510. Alternatively, the search is aborted at 510. An example of when the search might be aborted is when the purpose of the search was to determine whether a particular file has been deleted. In this example, a lack of a match might be enough information to stop searching.

If the current record is not located after a record that would correspond to the current file system name or end of directory at 506, then sibling offset is used to get the next sibling record at 504. An example of using sibling offset to get the next sibling offset can be seen in the record file shown in FIG. 4B. If directory 1 is the current record, then its sibling offset, 4 in this example, may be used to get the next sibling record of directory 2. Accordingly, file 1 and file 2 are quickly skipped.

Thereafter, it is determined whether this new current record name matches the current file system name at 508.

If this current record name matches the current file system name at 508, then it is determined whether there are more directory components at 512. For example, if the file system path is directory 1/file 1/file2, and directory 1 is the current file system name that is being analyzed, then since there are more directory components shown in FIG. 4A, then the directory tree is descended at 516 to reach file 1, and the current record is set equal to the next record in the record file and the current file system name is set equal to the next component at 518. In the example discussed in FIGS. 4A and 4B, if the current record was directory 1, then the new current record is now file 1 since it is the next record in the record file of FIG. 4B. Likewise, if the current file system name was directory 1, then the next component of directory 1/file 1/file 2 is file 1 which is now the new current file system name to be analyzed.

If there are no more directory components at 512, then a match has been found at 514.

Figure 6:
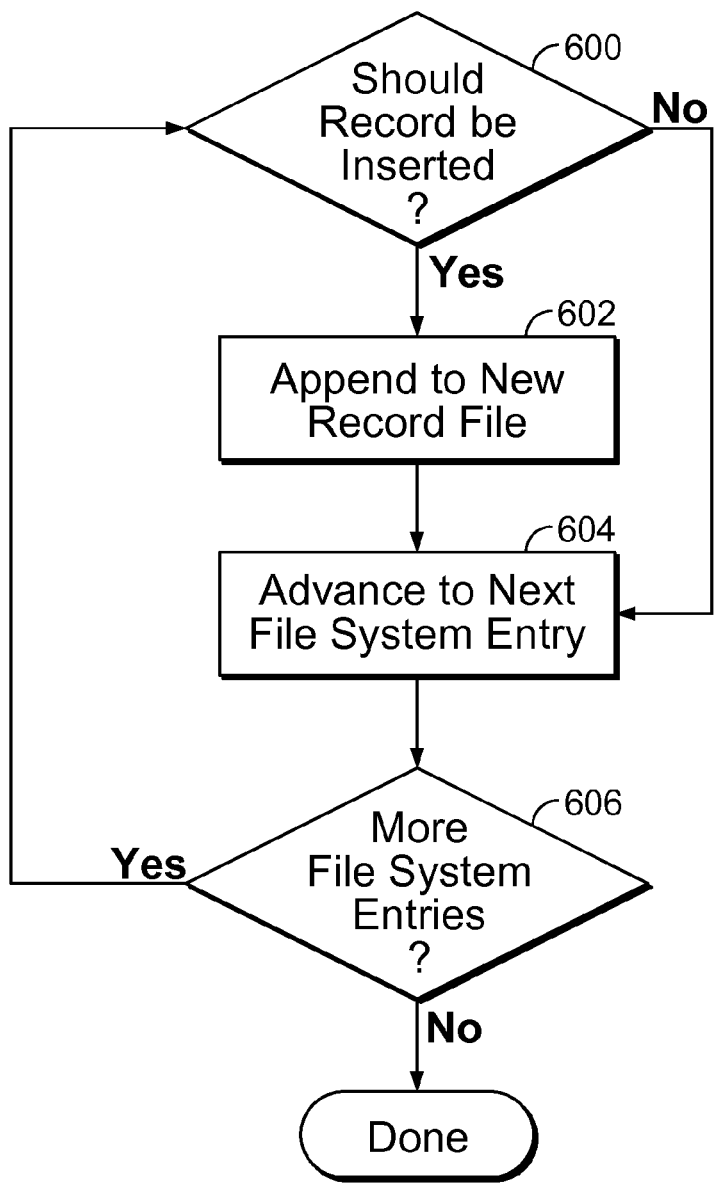
FIG. 6 is a flow diagram of inserting in some embodiments.

FIG. 6 is a flow diagram of inserting in some embodiments. In one example, a new file or directory may have been created since the last backup, and this new file or directory would not have a corresponding record in the record file. In another example, if a file or directory has been renamed since the last backup, then the renamed file system entry may be treated as a new file and backed up. For the current incremental backup, a corresponding record is created and inserted into an order reflecting the canonical order of the new file.

In the example shown in FIG. 6, it is determined whether a record should be inserted at 600. An example of when a new record should be inserted into the record file is when a corresponding file in the file system has been added since the last backup.

If it is determined that a record should be inserted, then a new record is added to the new record file at 602. In this example, the new record is not a part of the current record file. Instead, it is a part of the new record file. Further details of the interaction between the new record file and the current record file are later discussed in conjunction with FIGS. 7 and 8. Thereafter, the next file system entry is analyzed at 604.

Likewise, if it is determined that a new record should not be inserted at 600, then the next file system entry is analyzed at 604. It is also determined whether there are more file system entries at 606. If there are more file system entries at 606, then it is again determined whether a new record should be inserted at 600. If there are no more file system entries at 606, then the insertion process is finished.

In some embodiments, some file system entries may be skipped. One example of when a file system entry may be skipped is when only designated files or directories are to be backed up. If a file system entry is not designated for backup, then it should be skipped. Sibling offsets can be used to advance past such a file system entry without copying the corresponding record to the new record file. If the file system entry is a directory that includes other file system entries, then the corresponding block of records may be skipped.

In some embodiments, a file system entry may be deleted. An example of when a file system entry would be deleted is when a file or directory has been deleted since the last backup but the corresponding record still exists. If it has been determined to delete a record, then sibling offset may be used to advance past the record without copying it to the new records file. If the file system entry is a directory that includes other file system entries, then the corresponding block of records may be deleted.

Figure 7:
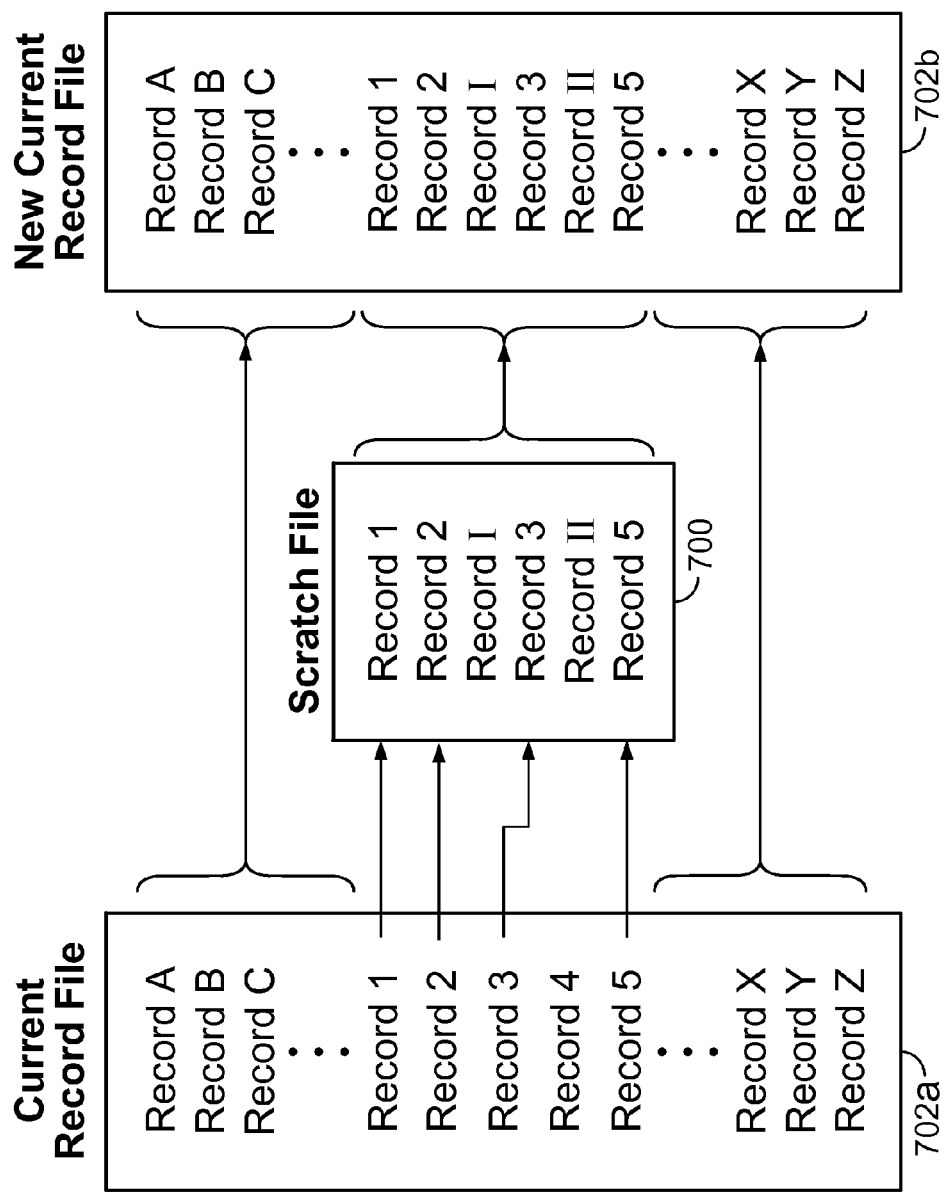
FIG. 7 is an example of merging in some embodiments.

FIG. 7 is an illustration of the use of record files and scratch files according to some embodiments. In this example, a current record file 702a is shown to have a portion of its contents transferred or copied to scratch file 700. Records 1, 2, 3, and 5 are shown to be copied over to scratch file 700 while record 4 is not. Records I and II are shown to be added to the scratch file as new records that did not show in the current record file 702a. Records 1, 2, 3, and 5 are moved to the scratch file 700 in the order shown in the current record file 702a, while records I and II are shown to have been inserted as new records. The order of the records in the scratch file 700 may be in the order of the files in the file system. Alternatively, the order of these records may be sorted in the scratch file 700 or in the new current record file 702b.

The records in scratch file 700 are shown to be copied to new current record file 702b. The records in the current record file 702a located above the ones moved to scratch file 700 are shown to be copied to new current record file 702b in a location that is above the records that were in scratch file 700. Likewise, the records of current record file 702a that were below those moved to scratch file 700 are copied to the new current record file 702b in a location that is below the records copied from scratch file 700. Accordingly, records 1-3 and 5, are shown to be copied from current record file 702a to scratch file 700, then copied, such as in a bulk copy, from scratch file 700 (along with new records I and II) to new current record file 702b. Records a-c are shown to be copied, such as in a bulk copy, from current record file 702a to new current record file 702b in the same relative location as they were to the records copied to the scratch file. In this case, they are copied to a location in the new current record file 702b above the scratch file 700 records. And records X, Y, Z are copied to a location below the scratch file records in the new current record file 702b.

The new current record file 702b may then be used as the "current record file" 702a, now having the contents of the new current record file 702b. In this manner, additions and deletions of records may be incorporated into the record file. For example, records I and II are insertions while record 4 is a deletion.

In one embodiment, the example shown in FIG. 7 works for multiple processors or servers working with scratch files such as scratch file 700. For example, records X, Y, Z could be copied to another scratch file with additions or deletions of records by a different server than the one that worked with scratch file 700. Both scratch files may be copied to the new current record file 702*b* along with records a, b, c.

In another embodiment, scratch file 700 is not used and the new records, records I and II, may be written directly into the new current record file 702*b*.

Figure 8:
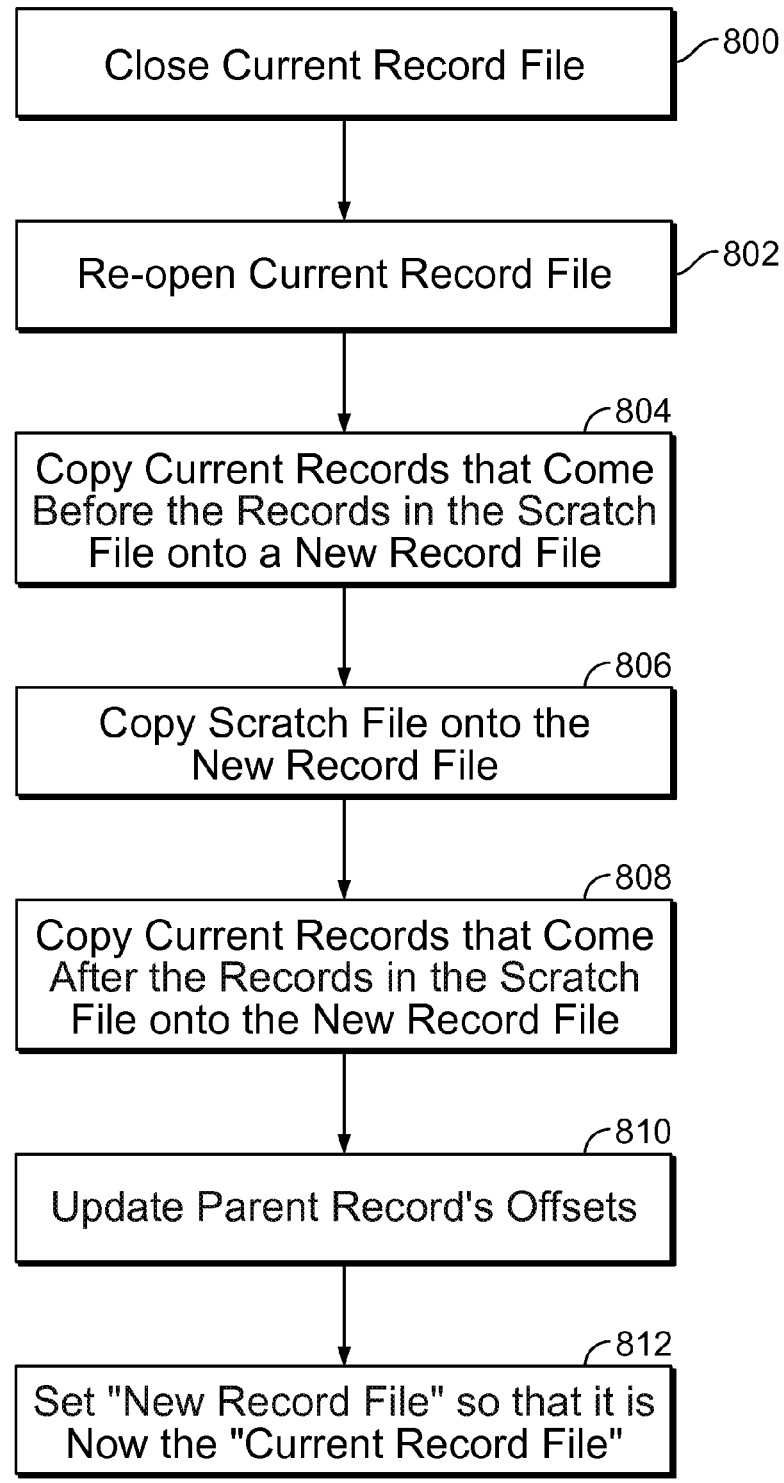
FIG. 8 is a flow diagram of merging in some embodiments.

FIG. 8 is a flow diagram of a method of backing up using record files and scratch files. In this example, the current record file is closed at 800 and reopened at 802. The closing and reopening of the current record file may serve to lock the record file so that no changes occur during the copying of records to a scratch file.

Current records that come before the records in the scratch file are copied onto a new record file at 804. The scratch file is then copied onto the new record file at 806. The current records that come after the records in the scratch file are copied onto the new record file at 808. Additionally, the parent record's offsets are updated at 810. For example, if "file 2" is deleted in FIG. 3, then the sibling offset of "Directory 1" would be changed to reflect that it is now closer to the next directory or file.

"New record file" is then set so that it is now the "current record file" at 812 of FIG. 8.

Figure 9A:
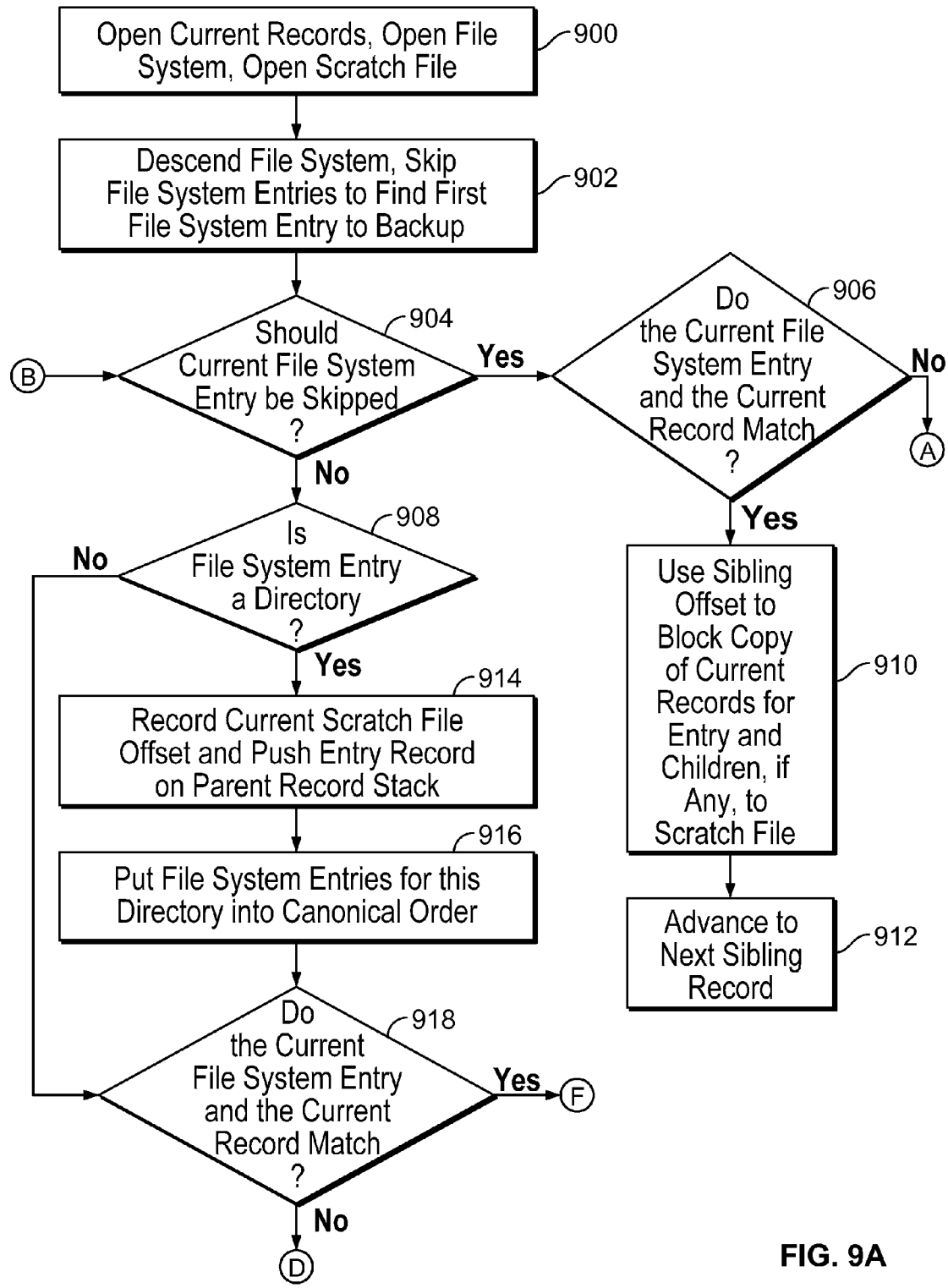
FIGS. 9A-9C are flow diagrams for information management in some embodiments.
Figure 9B:
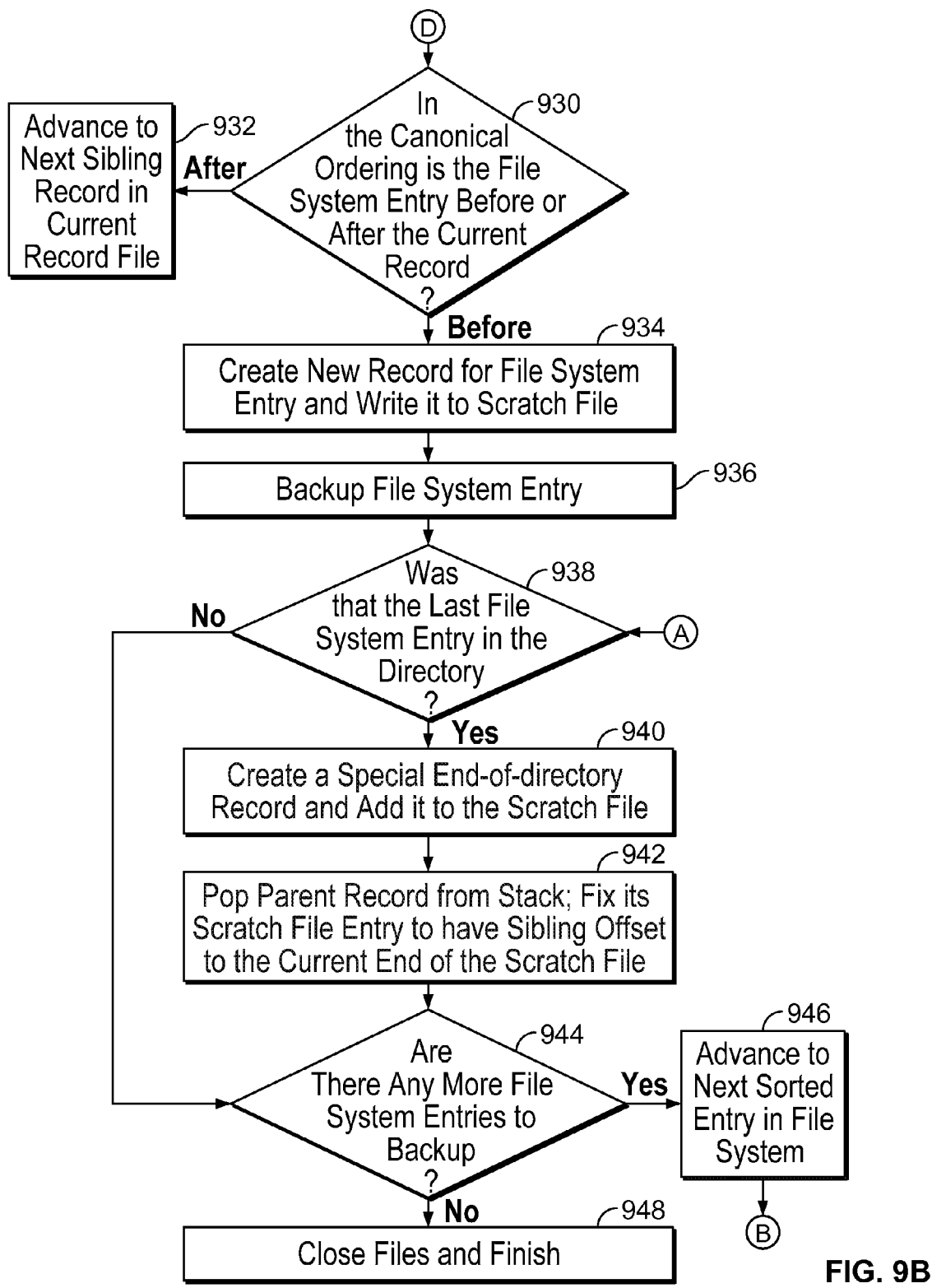
Figure 9C:
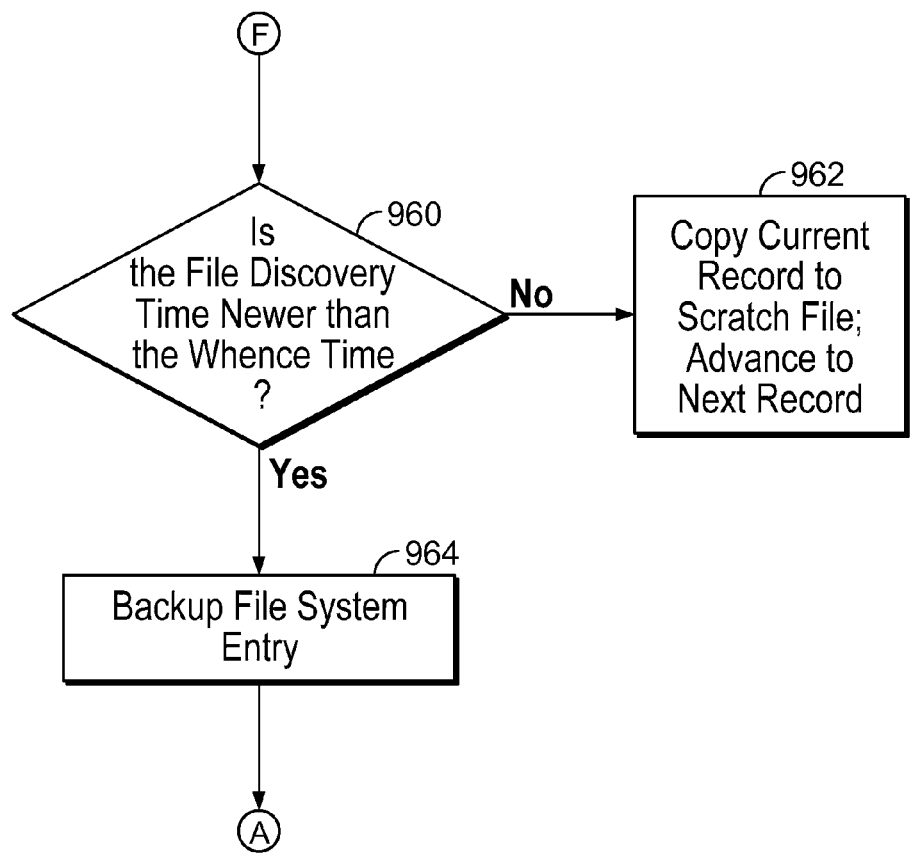

FIGS. 9A-9C are flow diagrams for information management in some embodiments. In this example, the current record file is opened, the file system is opened, and a scratch file is also opened at 900. For example, the current record file of FIG. 4B is opened, the file system shown in FIG. 4A is opened, and a scratch file 700 of FIG. 7 is opened.

The file system is descended, skipping file system entries to find the first file system entry to backup at 902. For example, if directory 2 of FIG. 4A is the first file system entry to be backed up, then the file system may be descended such that the sibling offset of directory 1 may be used to skip file 1 and file 2 to go directly to directory 2. An example of a method of descending the file system is a depth-first search.

It is then determined whether the current file system entry should be skipped at 904. An example of when the current file system entry is skipped is when the file system entry is within a directory that is not designated for backup. If the current file system entry should be skipped, then it is determined whether the current file system entry and the current record in the record file match at 906. For example, if the file system shown in FIG. 4A is descended in order, and directory 2 is the current file system entry, and the record in the record file shown in FIG. 4B are also reviewed in order, it is determined whether directory 2 matches the current record being analyzed in the record file.

If the current file system and the current record in the record file match at 906, then sibling offset may be used to block copy the current record to the scratch file at 910. If the current file system entry has children, then the records associated with the children file system entries are also copied to the scratch file at 910. For example, if directory 2 of FIG. 4A matches the current record of the record file shown in FIG. 4B, then the record corresponding to directory 2, directory 3, file 3, file 4, and file 5 are all copied to the scratch file in this example. The next sibling record in the record file then becomes the current record at 912.

If it is determined that the current file system entry should not be skipped at 904, then it is determined whether the file system entry is a directory at 908. If it is a directory, then the current scratch file offset is recorded and the entry record is pushed on a parent record stack at 914. In some embodiments, the scratch file contains the same type of information as the current record file. For example, a scratch file may contain the name of a file or directory, the discovery time, the inode number, and the sibling offset, and any other type of information that may be in the current record file.

The file system entries for this directory are then put into canonical order at 916. For example, the file system names are put in alphabetical order.

It is then determined whether the current file system entry and the current record match at 918. If the file system entry is not a directory at 908, it is also determined whether the current file system entry and the current record match at 918.

If the current file system entry and the current record does not match at 918, then it is determined whether the file system entry is located before or after the current record in the canonical ordering at 930. If is located after the current record then the next sibling record becomes the current record at 932. In some embodiments, the next sibling record refers to the record that corresponds to the sibling offset of the current record.

If the file system entry comes before the current record at 930, then a new record is created for the current file system entry and the new record is written to the scratch file at 934. The file system entry is then backed up at 936. It is then determined whether the current file system entry was the last file system entry in the directory at 938. If it was the last file system entry in the directory then an end of directory record is created and added to the scratch file at 940.

The parent record's scratch file entry may be changed to have its sibling offset signify the end of the scratch file at 942. In some embodiments, as a directory is being analyzed, the location of the directory is written on the parent stack. Upon exiting the directory, the end of directory can be interpreted by noting the end of the current scratch file and the contents of that directory. In this manner, the size of the directory may be determined in case it should be skipped at some point.

It is then determined whether there are any more file system entries to back up at 944. If the current file system entry was not the last file system entry in the directory at 938, then it is also determined whether there are any more file system entries to backup at 944. If there are no more file system entries to backup, then the files of the file system are closed, and the process is finished at 948. In some embodiments, if there are no more file system entries in the directory to backup, then a special end-of-directory record may be added to the scratch file and the record corresponding to the directory may have its sibling offset updated to the relative position of the next record. An example of the relative position of the next record is the current end-of-file position for the scratch file, minus the position of the parent record in the file.

If however, there are more file system entries to backup at 944, then the next sorted entry in the file system becomes the current file system entry to be analyzed at 946.

It is then determined whether the current file system entry should be skipped at 904 of FIG. 9A, and the process shown in FIGS. 9A-9C is repeated for the new current file system entry.

If the current file system entry and the current record match at 918 of FIG. 9A, then it is determined whether the file discovery time is newer then the whence time at 960 of FIG. 9C. The file discovery time may be an identifying marker, such as a time when the file associated with the file entry was first discovered. For example, it may be the first time the file was analyzed in a backup. The whence time, as used herein, may be an indication of when the last backup occurred. For example, the whence time may be the time elapsed since the last backup, or may be a time at which the last backup occurred. If the file discovery time is not newer than the whence time at 960, then the current record in the current record file is copied to the scratch file at 962, and the next record becomes the current record. If, however, the file discovery time is newer than the whence time at 960, then the file system entry is backed up at 964.

It is then determined whether the current file system entry was the last file system entry in the directory at 938 of FIG. 9B. Likewise, if the current file system entry and the current record matched at 906 of FIG. 9A, then it is also determined whether the current file system entry was the last file system entry in the directory at 938 of FIG. 9B. The method shown in FIGS. 9A-9C is then repeated for the current file system entry.

The technique shown in the figures and described above may be implemented in any suitable way, such as one or more integrate circuits and/or other device, or as firmware, software, or otherwise.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for tracking file system changes for backup comprising:
   reviewing a file system in a canonical order, wherein an entry is associated with the file system;
   providing a current record file, wherein a record includes a set of information associated with a particular file system entry for the file system and the record is associated with the current record file and a sibling offset, wherein the sibling offset indicates a relative offset to a next sibling entry in the record file, wherein the next sibling entry is associated with a directory or file on a same hierarchal level in a same parent directory as the particular file system entry, and the current record file is arranged in the canonical order;
   comparing the file system entry with the record;
   in the event that the file system entry does not correspond to the record:
   including in a scratch file a new record corresponding to the file system entry in the event it is determined that the file system entry does not correspond to the record because the file system entry is new; and
   not including the record in the scratch file in the event it is determined that the file system entry does not correspond to the record because the record corresponds to a deleted file system entry which is not currently associated with the file system; and
   merging the current record file with the scratch file in the canonical order to create a new current record file using the sibling offset to copy the record and its children to the new current record file.

2. The method of claim 1, wherein merging includes copying the new record from the scratch file to the new current record file.

3. The method of claim 1, wherein merging includes copying the new record from the current record file to the new current record file.

4. The method of claim 1, wherein merging includes copying the record from the current record file to the new current record file.

5. The method of claim 1, wherein merging includes copying the record from the current record file to the scratch file.

6. The method of claim 1, wherein merging includes using the sibling offset to copy the record and its children to the scratch file.

7. The method of claim 1, wherein the file system entry and a second file system entry are reviewed in a canonical order.

8. The method of claim 1, further comprising adding a second record to the new current record file wherein the second record is not in the current record file.

9. The method of claim 1, wherein comparing includes determining whether the file system entry is a newly-found file; and
   inserting a new record into the scratch file if it is determined that this file system entry is a newly-found file.

10. The method of claim 1, wherein comparing includes determining whether the file system entry is a newly-found file; and
    backing up the file system entry if the file system entry is a newly-found file.

11. The method of claim 1, wherein comparing includes determining whether the record is not associated with any file system entry in the file system; and
    wherein the record is not copied to the scratch file if it is determined that the record is not associated with any file system entry.

12. The method of claim 1, further comprising determining whether the file system entry is associated with the record;
    determining whether the file system entry is before the record in a canonical ordering, if it is determined that the file system entry is not associated with the record; and
    backing up the file system entry if it is before the record.

13. The method of claim 1, further comprising:
    determining whether a file discovery time is newer than a whence time, if the file system entry is associated with the record; and
    backing up the file system entry if the discovery time is newer than the whence time.

14. The method of claim 1, further comprising determining whether a file discovery time is newer than a whence time, if the file system entry is associated with the record; and
    copying the record to the scratch file if the discovery time is not newer than the whence time.

15. The method of claim 1, wherein comparing includes determining whether the record is after the file system entry in a canonical order; and
    inserting a second record if the record is after the file system entry.

16. A system for tracking file system changes for backup comprising:
    a processor configured to
    review a file system in a canonical order, wherein an entry is associated with the file system;
    provide a current record file, wherein a record includes a set of information associated with a particular file system entry for the file system and the record is associated with the current record file and a sibling offset, wherein the sibling offset indicates a relative offset to a next sibling entry in the record file, wherein the next sibling entry is associated with a directory or file on a same hierarchal level in a same parent directory as the particular file system entry, and the current record file is arranged in the canonical order;
    compare the file system entry with the record;
    in the event that the file system entry does not correspond to the record:
    include in a scratch file a new record corresponding to the file system entry in the event it is determined that the file system entry does not correspond to the record because the file system entry is new; and
    not include the record in the scratch file in the event it is determined that the file system entry does not correspond to the record because the record corresponds to a deleted file system entry which is not currently associated with the file system; and merge the current record file with the scratch file in the canonical order to create a new current record file using the sibling offset to copy the record and its children to the new current record file; and a memory coupled to the processor, wherein the memory is configured to provide the processor with instructions.

17. A computer program product for tracking file system changes for backup, the computer program product being embodied in a computer readable medium and comprising computer instructions for:

reviewing a file system in a canonical order, wherein an entry is associated with the file system;

providing a current record file, wherein a record includes a set of information associated with a particular file system entry for the file system and the record is associated with the current record file and a sibling offset, wherein the sibling offset indicates a relative offset to a next sibling entry in the record file, wherein the next sibling entry is associated with a directory or file on a same hierarchal level in a same parent directory as the particular file system entry, and the current record file is arranged in the canonical order;

comparing the file system entry with the record;

in the event that the file system entry does not correspond to the record:

including in a scratch file a new record corresponding to the file system entry in the event it is determined that the file system entry does not correspond to the record because the file system entry is new; and not including the record in the scratch file in the event it is determined that the file system entry does not correspond to the record because the record corresponds to a deleted file system entry which is not currently associated with the file system; and merging the current record file with the scratch file in the canonical order to create a new current record file using the sibling offset to copy the record and its children to the new current record file.

18. The method of claim 1, wherein the deleted file system entry is not included in a range with which the record is associated.

19. The system of claim 16, wherein merging includes using the sibling offset to copy the record and its children to the scratch file.

20. The system of claim 16, wherein the file system entry and a second file system entry are reviewed in a canonical order.

21. The system of claim 16, further comprising determining whether the file system entry is associated with the record; determining whether the file system entry is before the record in a canonical ordering, if it is determined that the file system entry is not associated with the record; and backing up the file system entry if it is before the record.

22. The system of claim 16, further comprising: determining whether a file discovery time is newer than a whence time, if the file system entry is associated with the record; and backing up the file system entry if the discovery time is newer than the whence time.

23. The system of claim 16, wherein comparing includes determining whether the record is after the file system entry in a canonical order; and inserting a second record if the record is after the file system entry.

24. The system of claim 16, wherein the deleted file system entry is not included in a range with which the record is associated.

25. The computer program product of claim 17, wherein merging includes using the sibling offset to copy the record and its children to the scratch file.

26. The computer program product of claim 17, wherein the file system entry and a second file system entry are reviewed in a canonical order.

27. The computer program product of claim 17, further comprising determining whether the file system entry is associated with the record; determining whether the file system entry is before the record in a canonical ordering, if it is determined that the file system entry is not associated with the record; and backing up the file system entry if it is before the record.

28. The computer program product of claim 17, further comprising: determining whether a file discovery time is newer than a whence time, if the file system entry is associated with the record; and backing up the file system entry if the discovery time is newer than the whence time.

29. The computer program product of claim 17, wherein comparing includes determining whether the record is after the file system entry in a canonical order; and inserting a second record if the record is after the file system entry.

30. The computer program product of claim 17, wherein the deleted file system entry is not included in a range with which the record is associated.

* * * * *